J. Allender,

Stopper Fastener,

No. 1,584. Reissued Dec. 1 1863.

H. PETERS, PHOTO-LITHOGRAPHER, WASHINGTON, D. C.

UNITED STATES PATENT OFFICE.

THOMAS PIMER, OF NEW LONDON, CONNECTICUT, ASSIGNEE OF JOHN ALLENDER, OF SAME PLACE.

IMPROVEMENT IN SECURING BOTTLE-STOPPERS.

Specification forming part of Letters Patent No. 13,338, dated July 24, 1855; Reissue No. 1,584, dated December 1, 1863.

*To all whom it may concern:*

Be it known that JOHN ALLENDER, of New London, in the county of New London and State of Connecticut, did invent a certain new and useful Improvement in Bottle-Fasteners; and I, THOMAS PIMER, also of said New London, being now the sole owner of said invention, do hereby declare that the following is a full, clear, and exact description thereof, reference being made to the annexed drawings, making a part of this specification, in which like letters indicate like parts throughout the figures.

Figure 3:
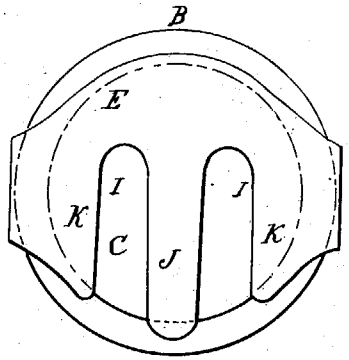
Figure 2:
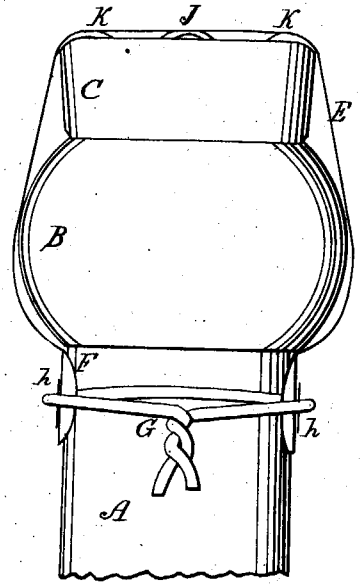
Figure 1:
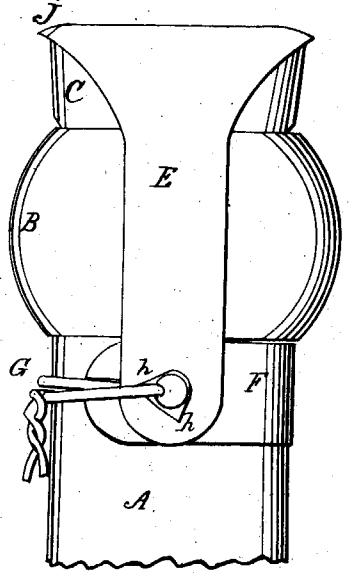

Previous to the date of said invention it had been usual to secure the corks in the bottles of liquids bottled under high pressures, generally of several atmospheres, by tying them down with twines in two directions, crossing the top of the cork at right angles. In bottling under these pressures a plunger is employed in the bottling-machine to drive the cork into place, and as the corks are necessarily of cheap quality the face of the plunger must be so large as to cover as much as possible of the cork, and still leave room for the tongs (by which the bottle is conveyed to the tying-clamp) to take over the cork around the plunger and hold the cork until it is properly under the tying-clamp. Here the two cross-tyings are put on, and the bottle is then removed by hand. When liquids were bottled under but little pressure, or were such as having none when bottled, but would in time generate gases, as cider, &c., and requiring no bottling machine or plunger, a single tying of twine has been found sufficient, and as a substitute for this a bail of wire, hinged at the ends to a ring encircling the neck of the bottle, was made to swing across the top of the cork and hold it satisfactorily. This could not have been effected, however, if a plunger such as I have described were resting on the cork; and this invention consists in so forming the confining-strap of a permanently-attached bottle-fastener that while the plunger of the bottling-machine is still holding the cork in place the strap may be brought into the position in which it will occupy generally that portion of the cork heretofore occupied by the tongs, and thus holding the cork after the plunger is withdrawn. The advantages of this are that the bottling, corking, and fastening are performed at one and the same place, and by a single operator, as rapidly as by three by the old process of tying with strings. A number of forms of construction may fulfill the conditions required, and one which I have found to answer very well is as follows:

In the accompanying drawings the upper end of the neck of a bottle is represented at A. At B is the bulging part at the neck of the bottle, and C the cork, fastened in the orifice by the metal strap E, which passes across the top of the cork and down each side of the bulge B, and is connected to the strap F, which partially surrounds the neck A, by the wire G, which fastens both straps to the neck A, and forms the fulcrum of the hinges formed on each side of the neck A by the junction of the ends of the straps E and F, so as to allow the former to be swung onto and off of the cork, so as to hold it in the orifice against the pressure of the contents of the bottle or allow the cork to be thrown out when required. In making the strap F the end of the punch which perforates it should be beveled off, so as to cut the metal from one side of the hole formed and turn it out, so that when the strap E is applied to it the portion turned out can be bent over, as represented in Fig. 1, at *h h*, so as to prevent the strap E from cutting the wire G as it is vibrated, that portion of the metal turned out being turned toward the end and the lower side of the strap F for that purpose. The top of the strap E may be made in such form where it crosses the cork as will best adapt it to the intended purpose. When, however, the cork is to be forced into place by means of a plunger which has a score across the head, as is often the case, I prefer to make the top of the strap in the form represented in Fig. 3—that is, with two scores, I I, extending partially across the top, so as to form a tongue, J, which passes into the score in the plunger and assists in holding the cork. The strap E may be in some parts swaged into arching form, so as to give greater stiffness and convenience of handling, in a manner well known.

In operation the strap E is thrown back over the top of the bottle, and when the liquid has been admitted and the plunger has driven the cork into place the filling-tube is then withdrawn, leaving the plunger resting upon the cork. The strap E can now be moved across the top, encircling the plunger on three sides, and if that is scored the tongue J will enter the score and cover still more of the cork. The plunger can then be withdrawn, and when the bottle is to be opened the strap E is turned back and the cork will fly out.

This fastener, while capable of repeated use on any one bottle, may also be removed from one to another, as in the case of a broken bottle.

I claim—

1. Forming the confining-strap of a permanently-attached bottle-cork fastener in the manner and for the purpose substantially as set forth.

2. Corking and fastening the cork by the combination of the plunger and of a confining-strap, such substantially as is herein described, whereby the cork may be permanently secured before the bottle is removed from the filling-machine, as set forth.

In witness whereof I have hereunto subscribed my name.

THOMAS PIMER.

Witnesses:

JOSEPH P. PIRSSON,

S. H. MAYNARD.